United States Patent
Clemons et al.

(10) Patent No.: US 11,585,449 B2
(45) Date of Patent: Feb. 21, 2023

(54) PILOT OPERATED BYPASS VALVE WITH REVERSE CHECK

(71) Applicant: Caterpillar Inc., Peoria, IL (US)

(72) Inventors: John Kevin Clemons, Wamego, KS (US); Cody T. Moore, Lorena, TX (US)

(73) Assignee: Caterpillar Inc., Peoria, IL (US)

( * ) Notice: Subject to any disclaimer, the term of this patent is extended or adjusted under 35 U.S.C. 154(b) by 171 days.

(21) Appl. No.: 17/075,925

(22) Filed: Oct. 21, 2020

(65) Prior Publication Data

US 2022/0120352 A1   Apr. 21, 2022

(51) Int. Cl.
*F16K 11/07*   (2006.01)
*F16K 27/04*   (2006.01)
*E02F 3/96*   (2006.01)

(52) U.S. Cl.
CPC ........ *F16K 11/0716* (2013.01); *F16K 27/041* (2013.01); *E02F 3/966* (2013.01)

(58) Field of Classification Search
CPC .... F16K 11/0716; F16K 11/105; F16K 11/10; F16K 15/021; F16K 15/026; F16K 27/041; F16K 1/26; F16K 1/38; F16K 1/443; F16K 3/267
See application file for complete search history.

(56) References Cited

U.S. PATENT DOCUMENTS

| | | | |
|---|---|---|---|
| 3,827,507 A | 8/1974 | Lance | |
| 3,870,074 A | 3/1975 | Hanser | |
| 4,344,564 A | 8/1982 | Magnuson | |
| 5,992,450 A | 11/1999 | Parker et al. | |
| 6,993,904 B2 | 2/2006 | Hazzard et al. | |
| 7,568,497 B1 | 8/2009 | Langenfeld et al. | |
| 2006/0196553 A1* | 9/2006 | Kane | F16K 15/026 137/538 |
| 2008/0245419 A1* | 10/2008 | Schlepp | F16K 1/126 137/219 |
| 2016/0053908 A1 | 2/2016 | Jaakko | |
| 2018/0209557 A1* | 7/2018 | Nishio | F16K 15/026 |
| 2018/0299025 A1* | 10/2018 | Hilzendegen | F16K 27/048 |
| 2019/0128436 A1* | 5/2019 | Pandian | F16K 15/18 |
| 2019/0178388 A1* | 6/2019 | Hata | F16K 1/32 |

FOREIGN PATENT DOCUMENTS

| CN | 104806787 A | 7/2015 |
|---|---|---|
| CN | 105971963 B | 2/2018 |
| CN | 108758003 B | 11/2019 |
| EP | 1197692 B1 | 4/2002 |

OTHER PUBLICATIONS

Written Opinion and International Search Report for Int'l Patent Appln. No. PCT/US2021/052760, dated Jan. 21, 2022 (11 pgs).

* cited by examiner

*Primary Examiner* — Kelsey E Cary
(74) *Attorney, Agent, or Firm* — von Briesen & Roper, s.c.

(57) ABSTRACT

An inner subassembly for assembling a valve assembly includes a spool defining a central bore that extends axially through the spool forming a spool annular wall, and including a spool cone tip that is disposed at the first axial end, as well as a hydraulic activation ridge extending radially outwardly from the spool annular wall, and that is disposed axially between the second axial end and the first axial end. The spool may further define a first bypass bore. A stem defines a first flow bore that aligns with the first bypass bore.

20 Claims, 12 Drawing Sheets

PILOT OPERATED BYPASS VALVE WITH REVERSE CHECK

TECHNICAL FIELD

The present disclosure relates to valves used on hydraulic hammers and the like employed in the earth moving, construction, and mining industries. Specifically, the present disclosure relates to such a valve that provides both bypass and reverse check functions in a limited space. The bypass function may divert some fluid flow away from the apparatus if the apparatus runs low on lubricant.

BACKGROUND

Hydraulic hammer assemblies, hydraulic pumps, and hydraulic motors often employ valves that provide various functions. One valve may prevent the unwanted reversal of fluid flow (sometimes referred to as a check valve). Another valve may allow flow to bypass the apparatus (sometimes referred to as a bypass or relief valve). Typically, these valves are separate from each other, taking up space in the apparatus.

U.S. Pat. No. 5,992,450 A to Parker et al. discloses a pump assembly (33) including a cartridge valve assembly (39) having a poppet member (69) biased toward a closed position (FIG. 4) when a pilot portion (51) is closed, under the influence of an electromagnetic actuator (53), so that flow entering an inlet port (65) flows out an outlet opening (61). When the actuator (53) is not energized (FIG. 1), a pilot poppet (89) and armature (93) are biased to an open position (FIG. 5) by a pilot spring (94), so that fluid in the inlet port (65) flows through an orifice (71) in the poppet member (69) and through the pilot portion (51) to a system reservoir (R), creating a pressure differential across the poppet member (69), and opening a tank port (67). Flow is then from the inlet port (65) to the tank port (67), thus operating in a "bypass" mode. Under excessive inlet pressure, the pilot portion (51) also serves a pressure relief function.

As can be seen, a need exists for a bypass valve, and a reverse check valve that take up that take up less space in an apparatus. More specifically in some applications, a bypass function when lubricant is running low may be desirable without using a solenoid or other electrical circuitry.

SUMMARY

An outer subassembly for assembling a valve assembly according to an embodiment of the present disclosure is provided. The outer subassembly may comprise a housing including an at least partially annular body, and an annular wall, defining a first central bore defining a longitudinal axis, a circumferential direction, a radial direction, as well as a first longitudinal end disposed along the longitudinal axis, and a second longitudinal end disposed along the longitudinal axis. The first central bore may extend through the second longitudinal end, and the annular wall may further define a first cross-bore extending radially through the annular wall to the central bore proximate to the flange, and a second cross-bore extending radially through the annular wall to the first central bore. The second cross-bore may be disposed axially between the second longitudinal end and the first cross-bore. A sleeve may define a thru-bore, forming a sleeve annular wall, and may further define a proximate end that is configured to mate with the second longitudinal end of the housing, and a distal end. The sleeve annular wall may further define a third-cross bore that extends radially through the sleeve annular wall, which is in communication with the thru-bore, and that is disposed adjacent the proximate end, as well as a fourth cross-bore that extends radially through the sleeve annular wall, which is in communication with the thru-bore, and that is disposed axially between the third cross-bore, and the distal end.

An inner subassembly for assembling a valve assembly according to an embodiment of the present disclosure is provided. The inner subassembly may comprise a spool defining a central bore that extends axially through the spool forming a spool annular wall, and including a spool cone tip that is disposed at the first axial end, as well as a hydraulic activation ridge extending radially outwardly from the spool annular wall, and that is disposed axially between the second axial end and the first axial end. The spool may further define a first bypass bore that extends through the spool annular wall to the second central bore, and that is disposed axially between the hydraulic activation ridge, and the first axial end. A stem may also be provided that is disposed in the central bore, the stem defining a closed axial end including a stem cone tip, an open axial end, and another central bore forming a stem annular wall. A first flow bore may extend radially through the stem annular wall that is disposed axially between the closed axial end and the open axial end, and the stem may include a stepped body such that the stem annular wall jogs radially outwardly at a place disposed axially between the first flow bore and the open axial end.

A valve assembly according to an embodiment of the present disclosure may comprise a housing including an at least partially annular body, and an annular wall, defining a first central bore defining a longitudinal axis, a circumferential direction, a radial direction, and a first longitudinal end disposed along the longitudinal axis, as well as a second longitudinal end disposed along the longitudinal axis. The housing may further include a flange disposed at the first longitudinal end and the first central bore extends through the second longitudinal end, the annular wall further defining a first cross-bore extending radially through the annular wall to the first central bore proximate to the flange, and a second cross-bore extending radially through the annular wall to the first central bore, the second cross-bore being disposed axially between the second longitudinal end and the first cross-bore. A sleeve may also be provided that defines a thru-bore, forming a sleeve annular wall, and further defines a proximate end that is configured to mate with the second longitudinal end of the housing, as well as a distal end that includes a radially inwardly extending rim that partially axially obstructs the thru-bore. The sleeve annular wall may further define a third-cross bore that extends radially through the sleeve annular wall, which is in communication with the thru-bore, and that is disposed adjacent the proximate end, as well as a fourth cross-bore that extends radially through the sleeve annular wall, which is in communication with the thru-bore, and that is disposed axially between the third cross-bore, and the distal end. Also, a spool may be provided that is disposed in the first central bore and the thru-bore, the spool defining a first axial end, a second axial end, a second central bore that extends axially through the spool forming a spool annular wall, and including a spool cone tip that is disposed at the first axial end. A hydraulic activation ridge may extend radially outwardly from the spool annular wall, and that is disposed axially between the second axial end and the first axial end. The spool may further define a first bypass bore that extends through the spool annular wall to the second central bore, and that is disposed axially between the first axial end and the hydraulic activation ridge. In addition, a stem may be provided that is disposed in the second central bore, the stem defining a closed axial end including a stem cone tip, an open axial end, a third central bore forming a stem annular wall, and a first flow bore that extends radially through the stem annular wall that is disposed axially between the closed axial end and the open axial end. The stem may include a stepped body such that the stem annular wall jogs radially outwardly at a place disposed axially between the stem cone tip and the open axial end.

BRIEF DESCRIPTION OF THE DRAWINGS

The accompanying drawings, which are incorporated in and constitute a part of this specification, illustrate several embodiments of the disclosure and together with the description, serve to explain the principles of the disclosure. In the drawings.

DETAILED DESCRIPTION

Reference will now be made in detail to embodiments of the disclosure, examples of which are illustrated in the accompanying drawings. Wherever possible, the same reference numbers will be used throughout the drawings to refer to the same or like parts. In some cases, a reference number will be indicated in this specification and the drawings will show the reference number followed by a letter for example, 100a, 100b or by a prime for example, 100', 100" etc. It is to be understood that the use of letters or primes immediately after a reference number indicates that these features are similarly shaped and have similar function as is often the case when geometry is mirrored about a plane of symmetry. For ease of explanation in this specification, letters and primes will often not be included herein but may be shown in the drawings to indicate duplications of features, having similar or identical function or geometry, discussed within this written specification.

Various embodiments of a valve assembly that are constructed according to the principles of the present disclosure will be discussed that may provide bypass, check valve, and lubrication protection functions in a compact space. Also, an exemplary machine that may employ the embodiments such as a hydraulic excavator will be discussed first with the understanding that any suitable machine including a skid steer, a backhoe, or other heavy equipment used in the earth moving, construction, and mining industries may use these embodiments. It is to be further understood that the described valves may be used in another apparatus other than a hydraulic hammer such as a hydraulic pump, or motor, etc.

Figure 1:
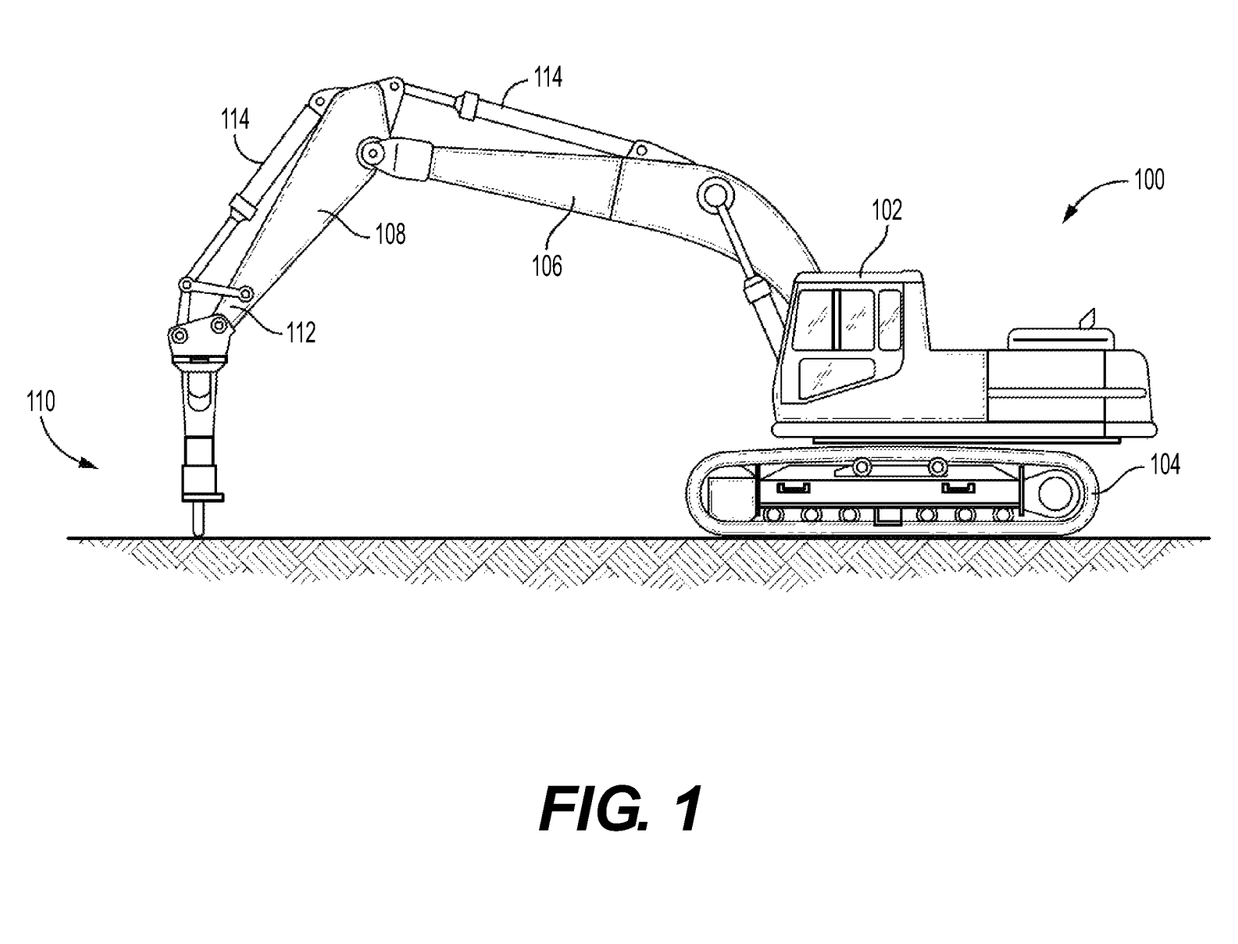
FIG. 1 is a side environmental view of a hydraulic excavator that may use a hydraulic hammer assembly with a valve assembly constructed according to various embodiments of the present disclosure.

Starting with FIG. 1, an excavating machine 100 (e.g. a hydraulic excavator) of a type used for digging and removing rock and soil from a construction worksite is shown. The excavating machine 100 may incorporate a cab body 102 containing an operator station, an engine, and operating controls (not depicted). The machine 100 may be supported by, and may move on, tracks 104. An extensible boom 106 may be movably anchored to the cab body 102, and an articulating stick 108, also sometimes called a lift arm, may be secured to and supported for movement on the boom 106. The excavating machine 100 may incorporate a hydraulic hammer assembly 110 as depicted, or may alternatively incorporate another implement, at an operational end 112 of the stick 108. Hydraulic cylinder actuators 114 may be utilized to move the stick 108 relative to the boom 106, and to move the hydraulic hammer assembly 110 relative to the stick 108.

Figure 2:
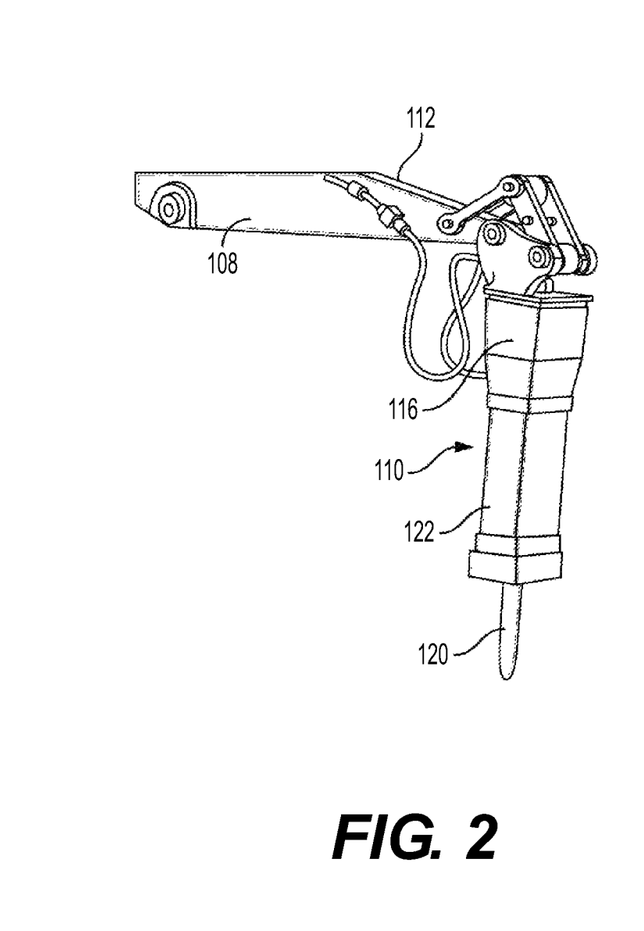
FIG. 2 is an enlarged detail view of the hydraulic hammer assembly of FIG. 1.

Referring now also to FIG. 2, the hydraulic hammer assembly 110 may be secured to the operational end 112 of the stick 108. The hydraulic hammer assembly 110 may include an upper portion 116 that includes a power cell 118 shown in FIG. 3, and a lower so-called front head portion 122 that is secured to the power cell 118. A hammer tool 120 having an upper end (not shown) may be retained within the front head portion 122. The hammer tool 120 may be adapted to produce cyclic vibrational movement at an intensity sufficient to demolish rocks, for example. The functional parts of the hydraulic hammer assembly 110, including the hammer tool 120 may be constructed of a forged or otherwise hardened metal such as a refined steel, for example, to assure appropriate strength, although other suitable materials such as diamond bits for operative portions of the hammer tool 120, for example, may be utilized within the scope of this disclosure.

Figure 3:
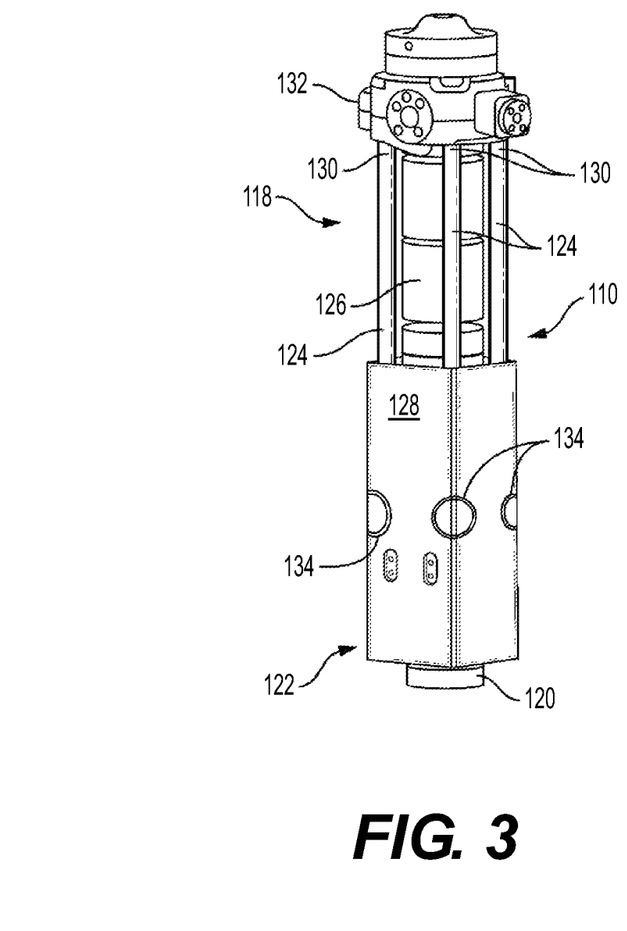
FIG. 3 is a perspective view of power cell assembly of the hydraulic hammer assembly of FIG. 2 shown in isolation for enhanced clarity.

Referring now also to FIG. 3, the hydraulic hammer assembly 110 is shown alone, i.e. detached from the stick 108 and with its exterior case covers removed, to reveal an exposed power cell 118, and a plurality of tie rods 124 circumferentially disposed about a cylindrical piston-containing sleeve structure 126. The sleeve structure 126 may contain a piston (not shown) adapted to drive the hammer tool 120. As such, the power cell 118 may be effective to utilize a suitable working fluid, such as a hydraulic and/or pneumatic fluid, for example, to reciprocally impact the piston against the upper end (not shown) of the hammer tool 120. It may also be appreciated that the plurality of tie rods 124 may be effective to retain or hold the power cell 118 and the front head portion 122 together under harsh impact loads as may be experienced within the hydraulic hammer assembly 110. In addition, a valve assembly 200 may be employed at the top of the hydraulic assembly to provide the various functions as described herein.

The lower front head portion 122 may define an actual front head 128, which may function as a structural housing to support the upper end (not shown) of the hammer tool 120. An upper end 130 of each of the tie rods 124 may be secured to an upper structure or upper head 132 of the power cell 118. Each tie rod 124 may have a threaded lower end (not depicted) that extends downwardly through a vertically oriented aperture or tie rod bore 134 within the front head 122. The tie rod bore 134 defines a longitudinal axis of the installed tie rod 124. Each tie rod 124 may be adapted to be threadedly secured to a tie rod nut 136 (see FIG. 4).

The hammer mechanism needs both hydraulic fluid/oil and lubricant in some cases to operate efficiently and with the desired longevity before maintenance is needed.

Figure 4:
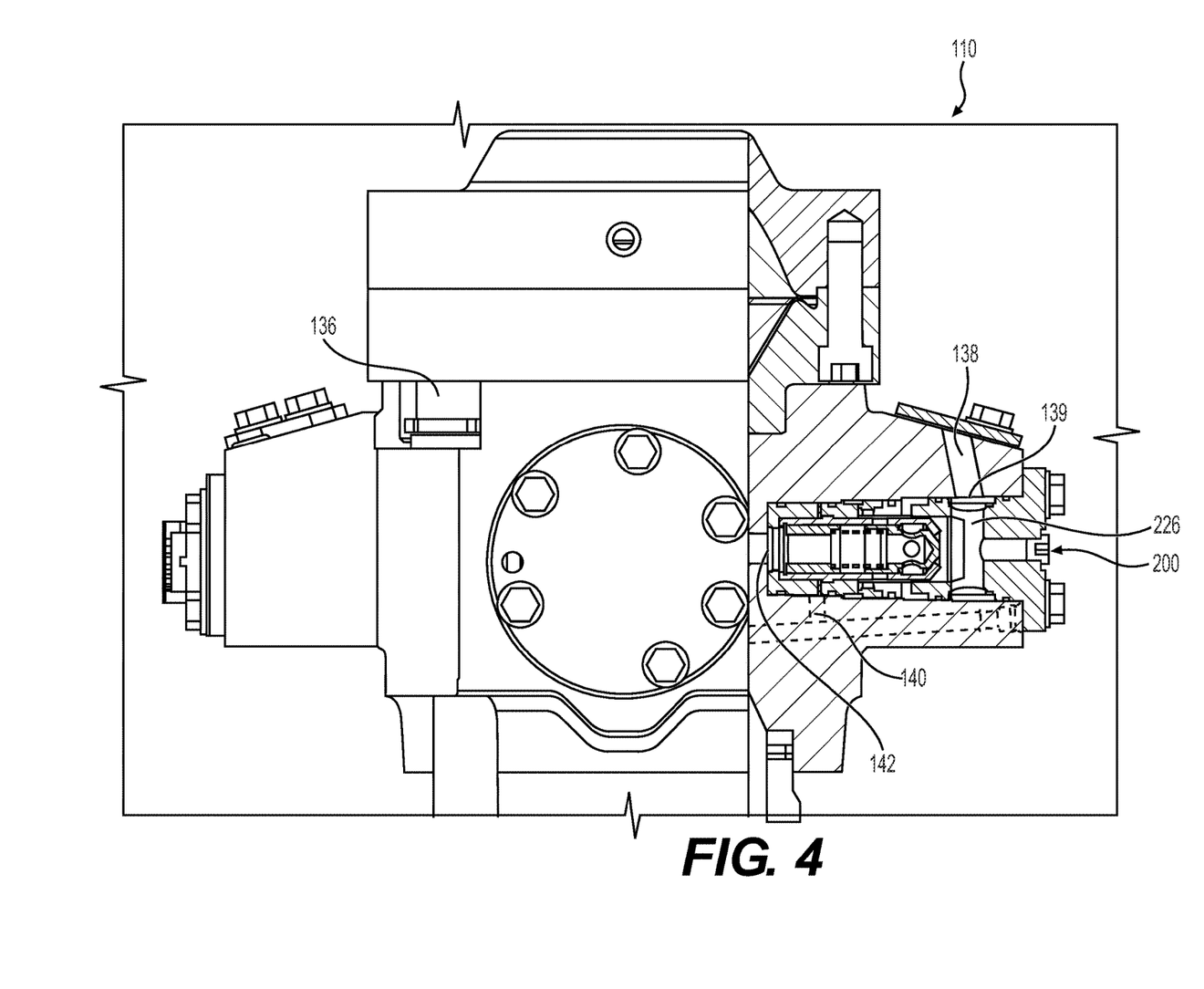
FIG. 4 is a side partial sectional view of the power cell of FIG. 3, revealing the valve assembly constructed according to an embodiment of the present disclosure.

FIG. 4 shows a valve assembly 200 that may help monitor the flow of hydraulic fluid/oil and lubricant to the hammer mechanism so that it works properly. A supply bore 138 introduces hydraulic fluid/oil to the valve assembly inlet 139, and which allows the fluid to reach the hammer mechanism by leaving the valve assembly outlet 142 at full capacity when lubricant is flowing at a proper level and the pressure in hammer mechanism is less than the inlet pressure for the hydraulic fluid/oil. However, if the lubricant is running low, then the valve assembly will bypass some of the fluid, decreasing the rate at which the hammer works to decrease the likelihood of damage or increased wear. If the pressure in the hammer mechanism is greater than the inlet pressure, then the valve closes acting as a check valve. The structure that achieves this in a compact space (i.e. via a single valve assembly) will be discussed in further detail now.

Figure 5:
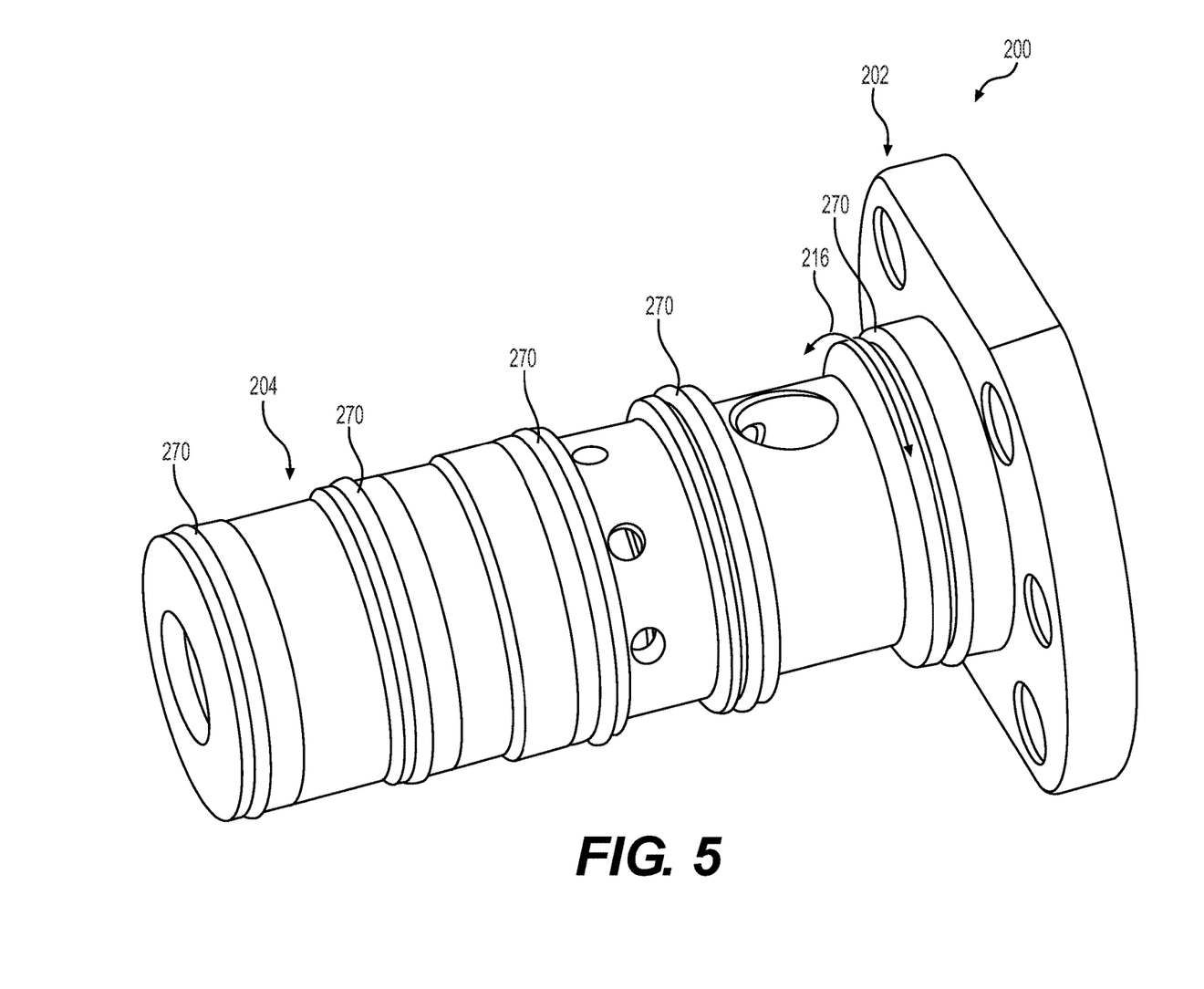
FIG. 5 is a perspective view of the valve assembly of FIG. 4 shown in isolation for enhanced clarity.
Figure 6:
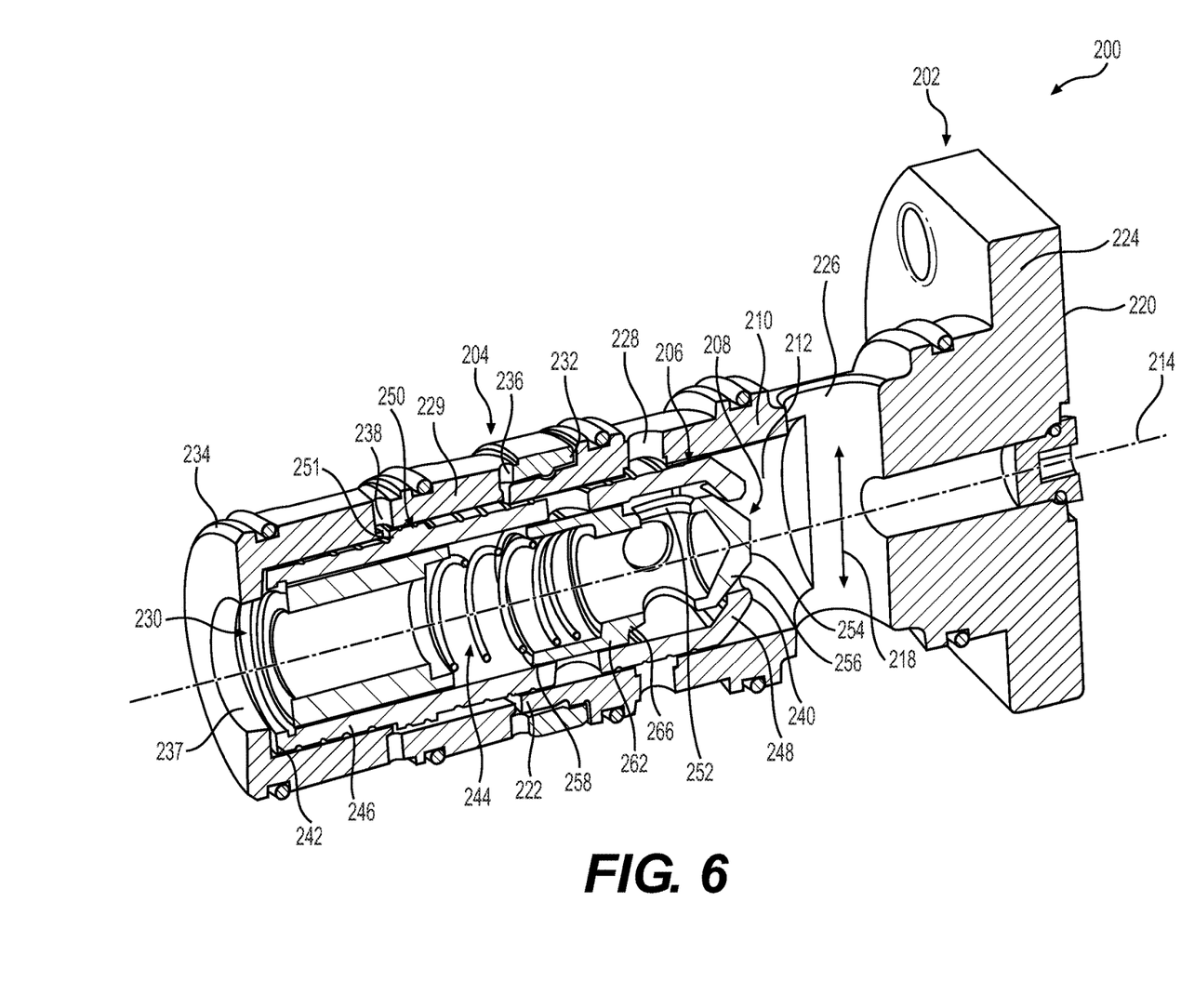
FIG. 6 is a sectional view of the valve assembly of FIG. 5, revealing the inner components and workings of the valve assembly.
Figure 7:
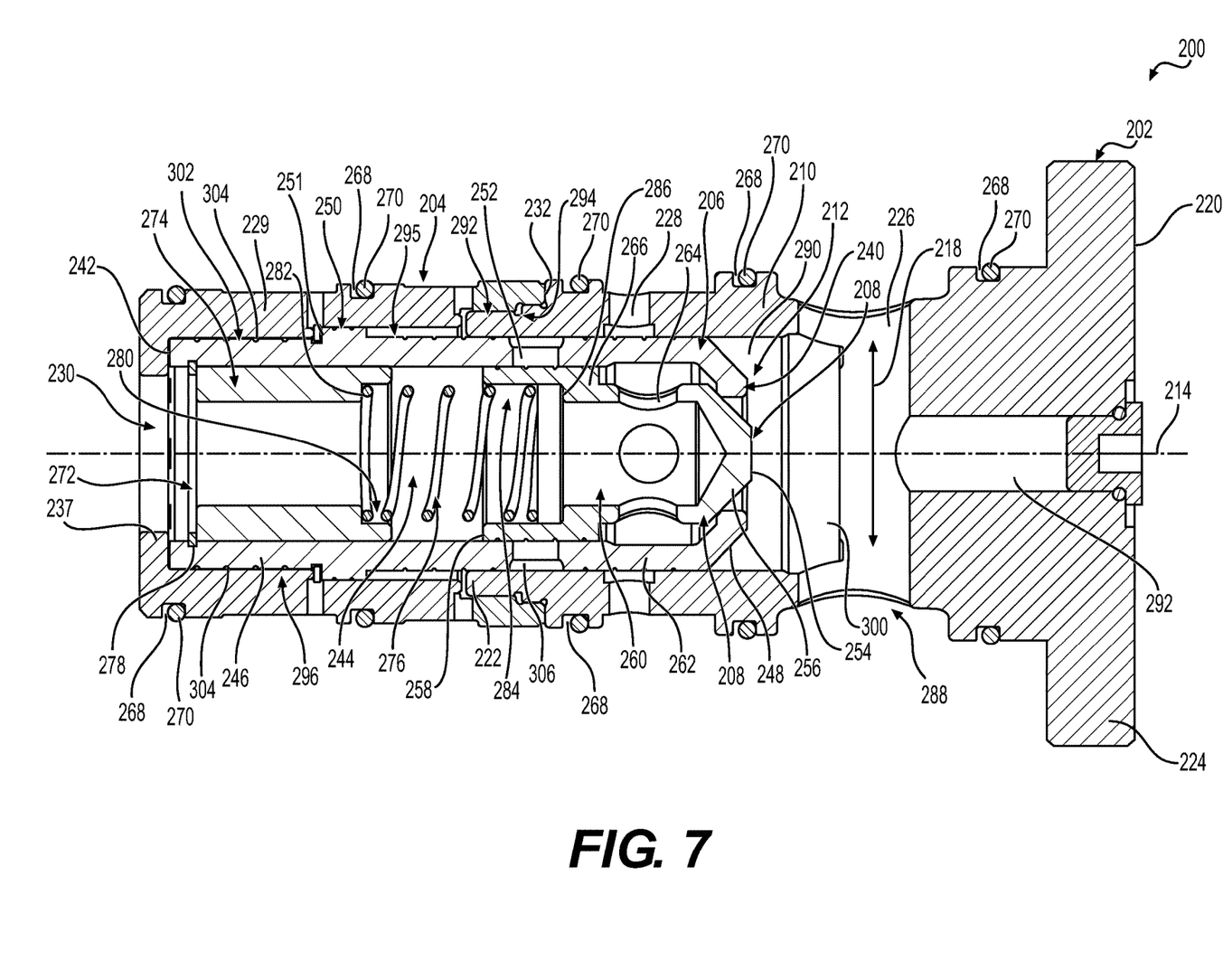
FIG. 7 is a side sectional view of the valve assembly of FIG. 6.

Referring now to FIGS. 5 thru 7, an embodiment of such a valve assembly 200 may comprise a housing 202, a sleeve 204, a spool 206 and a stem 208.

The housing 202 may include an at least partially annular body having an annular wall 210, and a first central bore 212 defining a longitudinal axis 214, a circumferential direction 216 (best seen in FIG. 5), and a radial direction 218 (best seen in FIGS. 6 and 7). A first longitudinal end 220 and a second longitudinal end 222 may be disposed along the longitudinal axis 214 (see FIGS. 6, 7 and 10). Also, a flange 224 may be disposed at the first longitudinal end 222, and the first central bore 212 may extend completely through the second longitudinal end 222. The annular wall 210 may further define a first cross-bore 226 that extends radially through the annular wall 210 to the first central bore 212 proximate to the flange 224. Likewise, a second cross-bore 228 may extend radially through the annular wall 210 to the first central bore 212. This second cross-bore 228 may be disposed axially between the second longitudinal end 222, and the first cross-bore 226. The functions of these various features will be explained later herein.

Figures 9, 10:
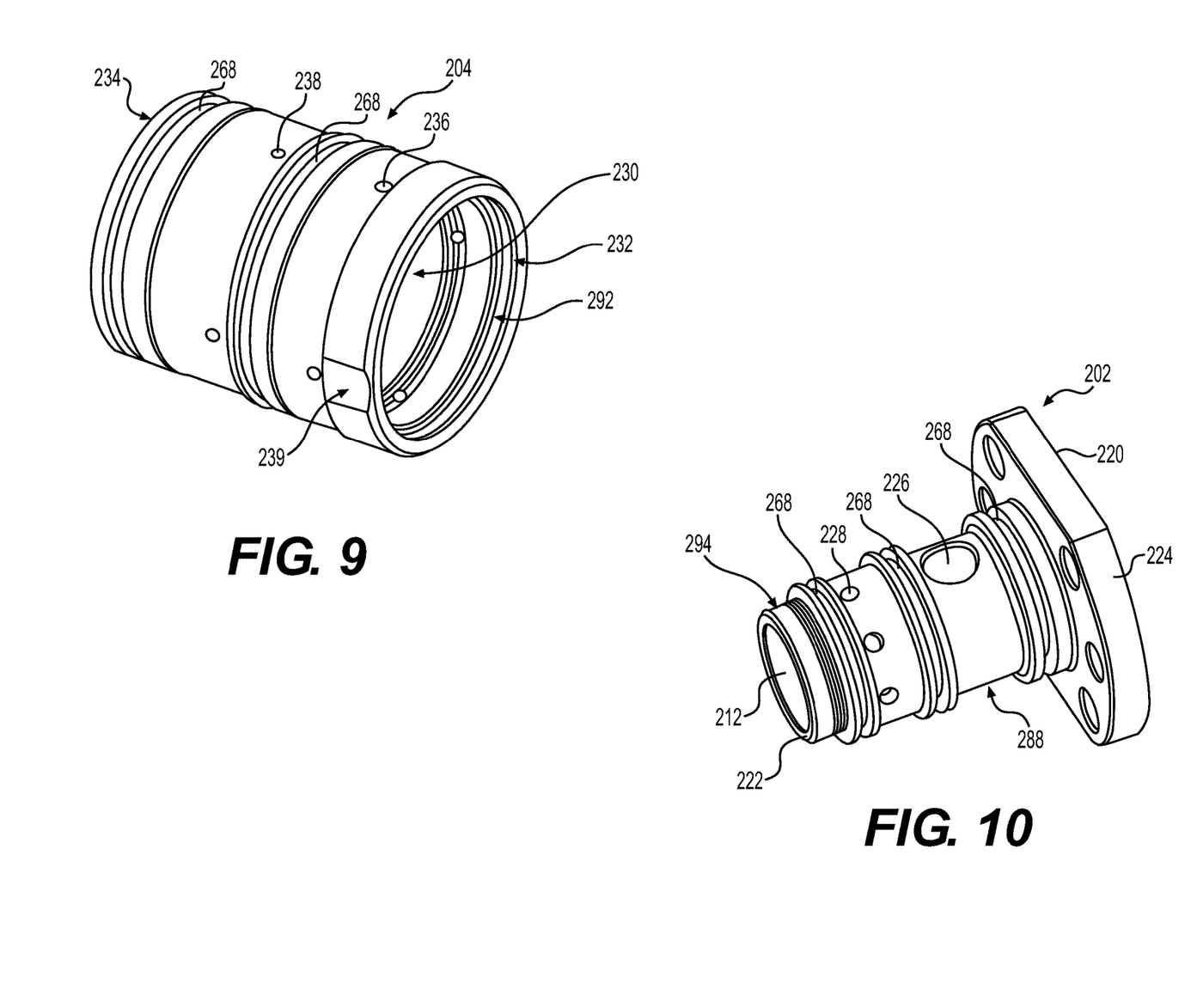
FIG. 9 is a perspective view of the sleeve of the valve assembly of FIG. 8 shown by itself.
FIG. 10 is a perspective view of the housing of the valve assembly of FIG. 8 shown by itself.

With reference to FIGS. 6, 7 and 9, the sleeve 204 may define a thru-bore 230, forming a sleeve annular wall 229. The thru-bore 229 of the sleeve 204 may be at least partially concentric or co-extensive with the first central bore 212 of the housing 204 when assembled. The sleeve 204 may also have a proximate end 232 (so called since it is nearest the housing 202) that is configured to mate with the second longitudinal end 222 of the housing 202 in a manner that will be described in further detail later herein. The distal end 234 of the sleeve 204 may include a radially inwardly extending rim 237 (may also be referred to as a "lip", a "ledge", etc.) that partially axially obstructs the thru-bore 230, creating a stop for the spool 206. This rim may be unitary with the body of the sleeve or may be a separate component that is attached to the sleeve, etc. Moreover, the sleeve annular wall 229 may further define a third-cross bore 236 that extends radially through the sleeve annular wall 229, that is in communication with the thru-bore 230, and that is disposed adjacent to the proximate end 232. A fourth cross-bore 238 may extend radially through the sleeve annular wall 229, that is also in communication with the thru-bore 230, and that is disposed axially between the third cross-bore 230, and the distal end 234.

Figures 11, 12, 13:
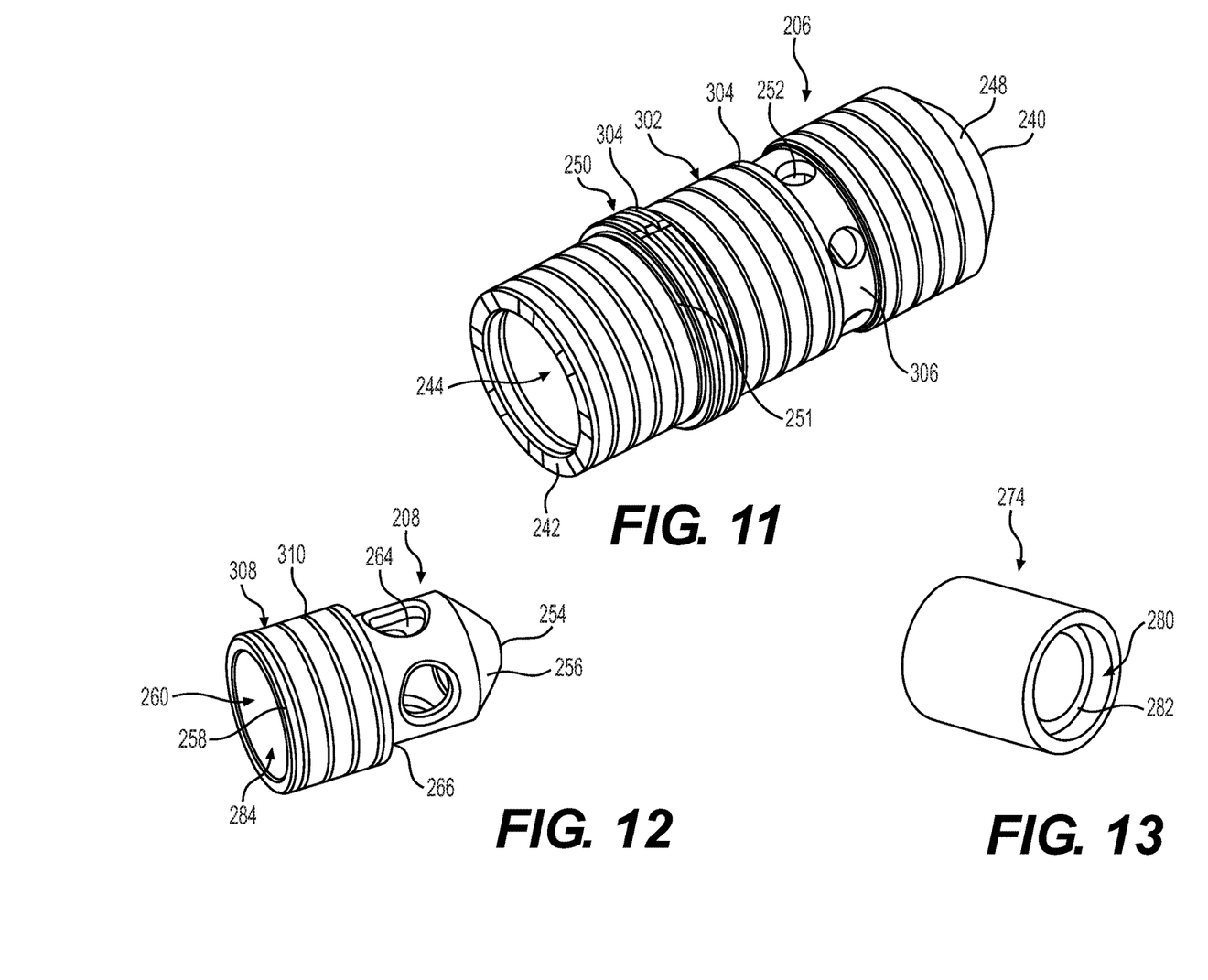
FIG. 11 is a perspective view of the spool of the valve assembly of FIG. 8 shown by itself.
FIG. 12 is a perspective view of the stem of the valve assembly of FIG. 8 shown by itself.
FIG. 13 is a perspective view of the stem of the guide assembly of FIG. 8 shown by itself.

Turning now to FIGS. 6, 7, and 11, the spool 206 may be disposed in the first central bore 212, and the thru-bore 230. The spool 206 may define a first axial end 240, a second axial end 242, a second central bore 244 that extends axially through the spool 26, forming a spool annular wall 246. A spool cone tip 248 may be disposed at the first axial end 240, and a hydraulic activation ridge 250 (so called because of hydraulic activation surface 251 that may receive fluid pressure as a signal if the lubricant to the hammer mechanism becomes too low) may extend radially outwardly from the spool annular wall 246. This ridge 250 may be disposed axially between the second axial end 242, and the first axial end 240. A first bypass bore 252 may extend through the spool annular wall 246 to the second central bore 244, and may be disposed axially between the first axial end 240, and the hydraulic activation ridge 250.

Looking at FIGS. 6, 7, and 12, the stem 208 may be disposed in the second central bore 244 of the spool 206. The stem 208 may define a closed axial end 254 including a stem cone tip 256, an open axial end 258. The stem 208 may also have a third central bore 260 forming a stem annular wall 262. A first flow bore 264 may extend radially through the stem annular wall 262 that is disposed axially between the closed axial end 254, and the open axial end 258. The stem 208 may also include a stepped body such that the stem annular wall 262 jogs radially outwardly at a place 266 disposed axially between the stem cone tip 256, and the open axial end 258.

It should be noted that any of these components and their features may be differently configured in other embodiments of the present disclosure. Also, the cross-bores, the bypass bore, and the flow bore may be part of a circular array of a plurality of such bores about the longitudinal axis 214 as seen in FIGS. 9 thru 12. Also, a plurality of seal grooves 268 and seals 270 (see FIGS. 7, 9, and 10) may be provided between each of the cross-bores for preventing leaks when the valve assembly is installed into the hammer assembly.

Figure 8:
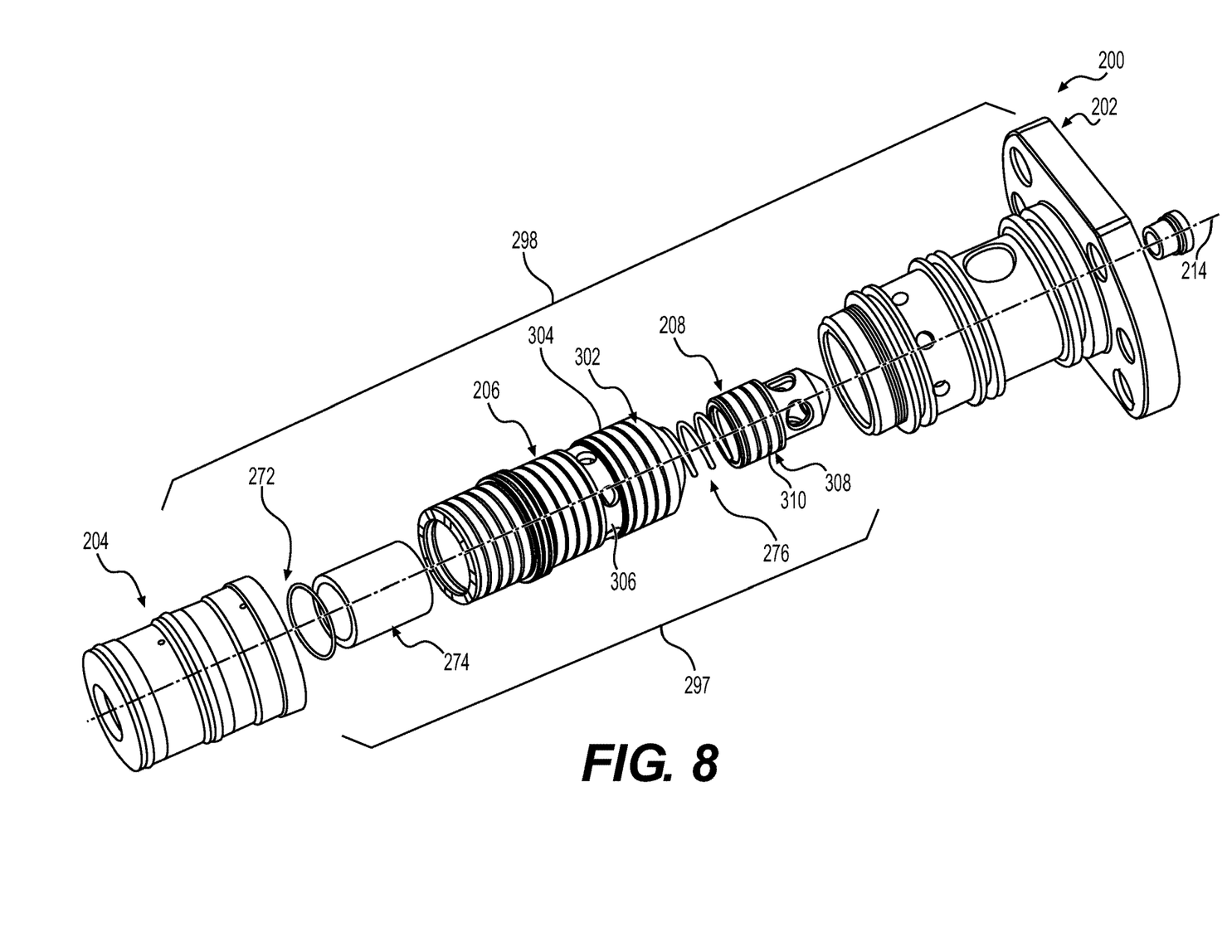
FIG. 8 is an exploded assembly view of the valve assembly of FIG. 5.

Looking at FIGS. 7 and 8, a snap ring 272, a guide 274 (may also be referred to as an "end cap" or a "spacer", etc.), and a compression spring 276 may be also be installed in the spool 206. More specifically, the spool 206 further defines a snap ring groove 278 that is disposed near the second axial end 242, and that is in communication with the second central bore 244.

During assembly, the stem 208 is inserted into the spool 206, the compression spring 276 is then inserted into the stem 208, and then the guide 274 is inserted into the spool 206, trapping the compression spring 276 between the stem 208 and the guide 274. The snap ring 272 may be then inserted into the spool 206 and snapped into the snap ring groove 278. Now, the guide 274 may abut the snap ring 272 due to the spring force that forces the guide 274 and the stem 208 in opposite axial directions. The stem cone tip 256 may also abut the spool cone tip 248 due to the spring force (see FIG. 7). As will be discussed in more detail later herein, the stem 208, the guide 274, the snap ring 272, the compression spring 276, and the spool 206 may form an inner subassembly 297 (see FIG. 8) for assembling the valve assembly 200.

In FIGS. 7 and 13, the guide 274 may define in certain embodiments a distal spring pocket 280 including a distal shoulder surface 282, while the stem 208 may define a proximate spring pocket 284 disposed at its open axial 258 end, which also includes a proximate shoulder surface 286. In such embodiments, the compression spring 276 is seated in these pockets 280, 284, and contacts the distal shoulder surface 282, and the proximate shoulder surface 286.

Looking at FIGS. 7 and 10, the housing 202 may also define a peripheral groove 288 that extends circumferentially, and which is in communication with the first cross-bore 226, while the first cross-bore 226 may extend radially completely through the housing 202. These features may be differently configured in other embodiments of the present disclosure.

Focusing on FIG. 7, the first central bore 212 may include a large diameter portion 290 that extends through the second longitudinal end 222, and a small diameter portion 292 that extends through the first longitudinal end 220. A plug may be disposed in the small diameter portion 292 when assembled to block off any flow.

In addition, the proximate end 232 of the sleeve 204 may include a stepped pilot pocket 292 (see also FIG. 9) that is in communication with the thru-bore 230 of the sleeve 204, while the second longitudinal end 222 of the housing 202 may include a stepped pilot ring 294 (see also FIG. 10) that fits into the stepped pilot pocket 292 of the sleeve 204. Hence, these components may interface or mate as alluded to earlier herein. Other interfaces may be provided in other embodiments of the present disclosure. For example, these features may be swapped with each other, etc.

Still looking at FIG. 7, the thru-bore 230 may define an intermediate diameter portion 295 that extends axially from the stepped pilot pocket 293 toward the distal end 234, and a reduced diameter portion 296 may extend axially from the intermediate diameter portion 295 toward the rim 237 that is disposed at the distal end 234. The hydraulic activation ridge 250 may be disposed in the intermediate diameter portion 295, while the spool annular wall 246 may be disposed in the reduced diameter portion 296 of the thru-bore 230 of the sleeve 206. The first central bore 212 of the housing 202, and the third cross-bore 236 and the fourth cross-bore 238 are in fluid communication with the intermediate diameter portion 295 on either axial side of the hydraulic activation ridge 250. The third cross-bore 236 may act as a vent while the fourth cross-bore 238 may allow a hydraulic signal to reach the hydraulic activation surface 251 when lubrication is running low.

An outer subassembly 298 may be provided as a kit for assembling the valve assembly 200 in field. This outer subassembly 298 may comprise a housing 202, and a sleeve 204 as previously described herein (see FIG. 8). The flange 224 and the rim 237 may be omitted or may be supplied as separate parts that are later attached to the housing and the sleeve respectively.

In some embodiments as seen in FIG. 7, the flange 224 may be unitary with the body of the housing 202, and may be disposed at the first longitudinal end 220. The peripheral groove 288 is in communication with the first cross-bore 226, and the first cross-bore 226 extends radially completely through the housing 202. A test bore 292 extends from the first cross-bore 226 through the flange 224, allowing the valve assembly 200 to be pressure tested before being installed into the hammer assembly.

As alluded to earlier herein, the housing and sleeve may be attached to each other when formed as separate components (not necessarily true in other embodiments of the present disclosure). For the embodiment shown in FIGS. 7 and 9, the proximate end 232 of the sleeve 204 includes a stepped pilot pocket 292 that is in communication with the thru-bore of the sleeve 230. As depicted in FIGS. 7 and 10, the second longitudinal end 222 of the housing 202 includes a stepped pilot ring 294 that fits into the stepped pilot pocket 292 of the sleeve 230. A threaded interface may be provided between these features for attaching the housing and the spool together, or the parts may be adhered to each other, etc. When threads are used, wrench flats 239 (see FIG. 9) may be provided on the sleeve as well as a vice flat (see FIG. 10) on the flange 224 of the housing for screwing and unscrewing these parts.

The thru-bore 230 defines an intermediate diameter portion 295 that extends axially from the stepped pilot pocket 293 toward the distal end 234, and a reduced diameter portion 296 that extends axially from the intermediate diameter portion 296 toward the distal end 234. The third cross-bore 236 and the fourth cross-bore 238 are in fluid communication with the intermediate diameter portion 295.

The sleeve may also include a radially inwardly extending rim 237 that partially axially obstructs the thru-bore 230, and the housing 202 further defines a radially inner circumferentially extending slot 299 that is axially aligned with the second-cross bore 228, being in fluid communication therewith. A concave stop surface 300 that may be complimentarily shaped to engage the stem cone tip 256 to stop axial movement of the stem 208 may be provided at an intersection of the first cross-bore 226, and the first central bore 212 (see FIGS. 7 and 16).

When the rim 237 is unitary with the sleeve 204, an inner subassembly 297 may be inserted into the sleeve 204 (at least partially) before the outer subassembly 298 is assembled to complete the valve assembly 200 as alluded to earlier herein.

The inner subassembly 297 may also be provided as a kit to retrofit or repair a valve assembly 200 in the field.

Looking at FIGS. 7 and 8 together, the inner assembly 297 may include a spool 206, a stem 208, a snap ring 272, a guide 274, and a compression spring 276 as previously mentioned herein.

In FIG. 7, the spool 206 further defines a snap ring groove 278 that is disposed near the second axial end 242, and that is in communication with the second central bore 242. The snap ring 272 is disposed in the snap ring groove 278, and the guide 274 abuts the snap ring 272. The compression spring 276 contacts the guide 274 and the stem 208.

The guide 274 defines a distal spring pocket 280 including a distal shoulder surface 282, and the stem 208 defines a proximate spring pocket 284 that is disposed at the open axial end 258 of the stem 208. The proximate spring pocket 284 also includes a proximate shoulder surface 286, and the compression spring 276 contacts the distal shoulder surface 282 and the proximate shoulder surface 286.

The stem cone tip 256 contacts the spool cone tip 248 once assembled, and the stem annular wall 262 covers the first bypass bore 252 that is axially aligned with the second cross-bore 228 of the housing 202.

As seen in FIGS. 7, 8, 11 and 12, the spool 206 defines a radially outer circumferential surface 302 that defines a plurality of outer circumferentially extending slits 304, and a radially outer circumferential slot 306 that is axially aligned with the first bypass bore 252, and is in fluid communication therewith. The stem 208 includes a radially inner circumferential surface 308 that defines a plurality of circumferentially extending grooves 310 at an interface between the spool annular wall 246, and the stem annular wall 262.

The components of the valve assembly may be manufactured from any suitable material including, but not limited to, steel, aluminum, thermoplastics, etc. as long as the material is durable enough to withstand the pressures, and are chemically compatible with the fluids being used.

Any of the dimensions, configurations, etc. discussed herein may be varied as needed or desired to be different than any value or characteristic specifically mentioned herein or shown in the drawings for any of the embodiments.

INDUSTRIAL APPLICABILITY

In practice, a valve assembly, an inner subassembly, an outer subassembly, and/or hydraulic hammer assembly constructed according any embodiment disclosed herein may be sold, bought, manufactured or otherwise obtained in an OEM (original equipment manufacturer) or after-market context. In some cases, various components of the valve assembly, inner subassembly, and the outer subassembly may be provided as a kit to repair or retrofit a hydraulic hammer assembly or other apparatus (e.g. a hydraulic pump, or motor, etc.) in the field.

The valve assembly 200 may be used as follows in the hydraulic hammer assembly 110 as shown in FIGS. 4 and 14 thru 16.

Initially, hydraulic fluid enters from the supply bore 138 (see FIG. 4) to first cross-bore 226 of the valve assembly. If lubricant is not running low, and the pressures in the hammer mechanism are lower than at the supply bore 138, then the valve assembly 200 will achieve the configuration shown in FIG. 14. Note that the stem is shown in a leftmost position since the spring force is overcome (spring not shown in FIGS. 14 and 15).

Figure 14:
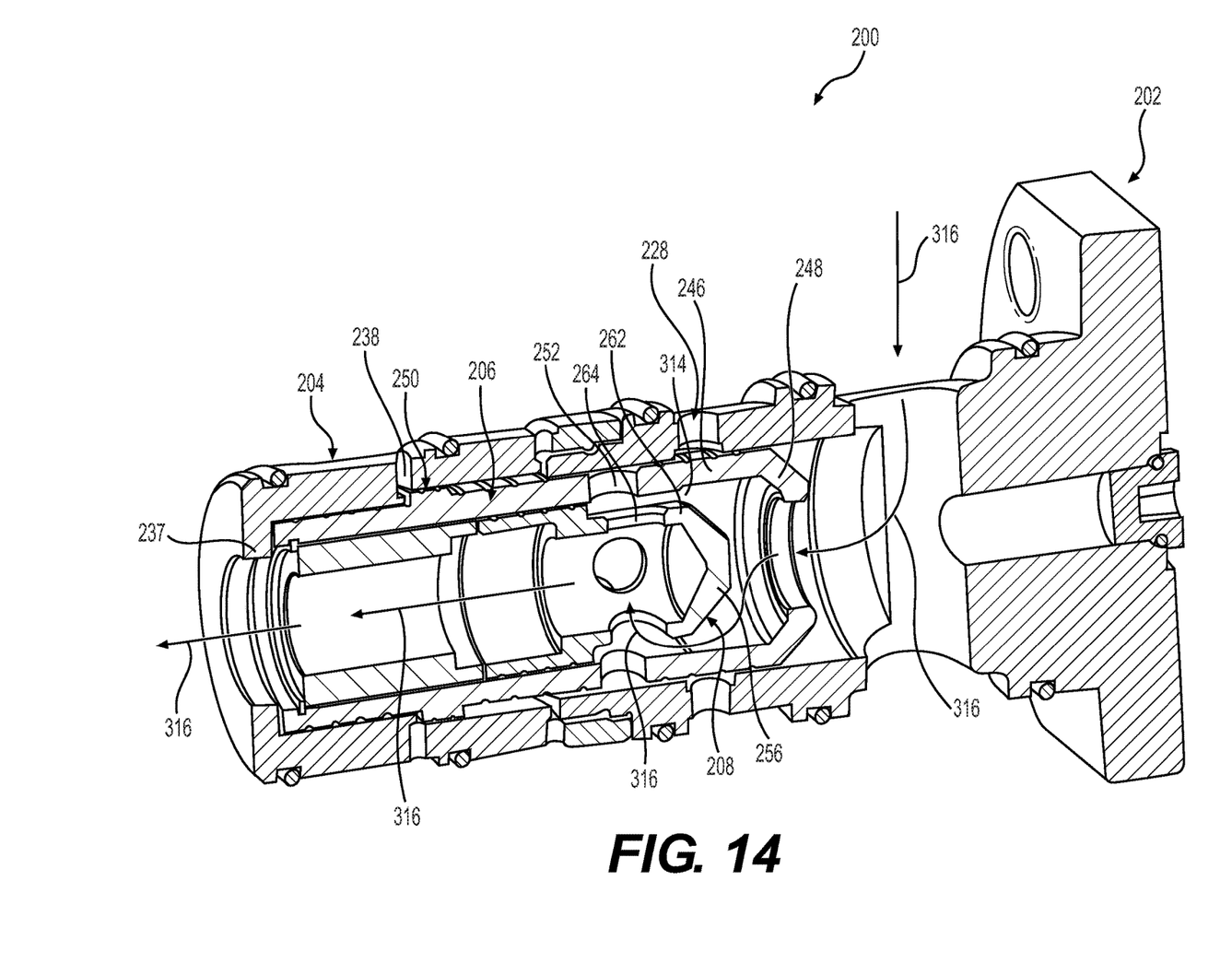
FIG. 14 is a sectional view of the valve assembly of FIG. 5 with the spool and the stem shifted to a leftmost position, allowing a full flow of fluid to pass through the valve assembly.

In FIG. 14, the spool 206 is shifted to a leftmost position where the spool 206 contacts the rim 237 of the sleeve 204. Also, the stem 208 is shifted to a leftmost position contacting the snap ring 272. As a result, the first bypass bore 252 of the spool 206, and the first flow bore 264 of the stem 208 are axially aligned with each other, the spool annular wall 246 covers the second cross-bore 228 of the housing 202, the stem cone tip 256 is spaced axially away from the spool cone tip 248, forming a flow path 314 between the stem annular wall 262, and the spool annular wall 246. The hydraulic activation ridge 250 is disposed axially proximate to the fourth cross-bore 238 of the sleeve 204 since no hydraulic signal has been sent through this bore 238 indicating the lubricant is running low.

Hence, the valve assembly 200 is in full flow configuration since no flow is redirected through the bypass. This flow is denoted by arrows 316.

Figure 15:
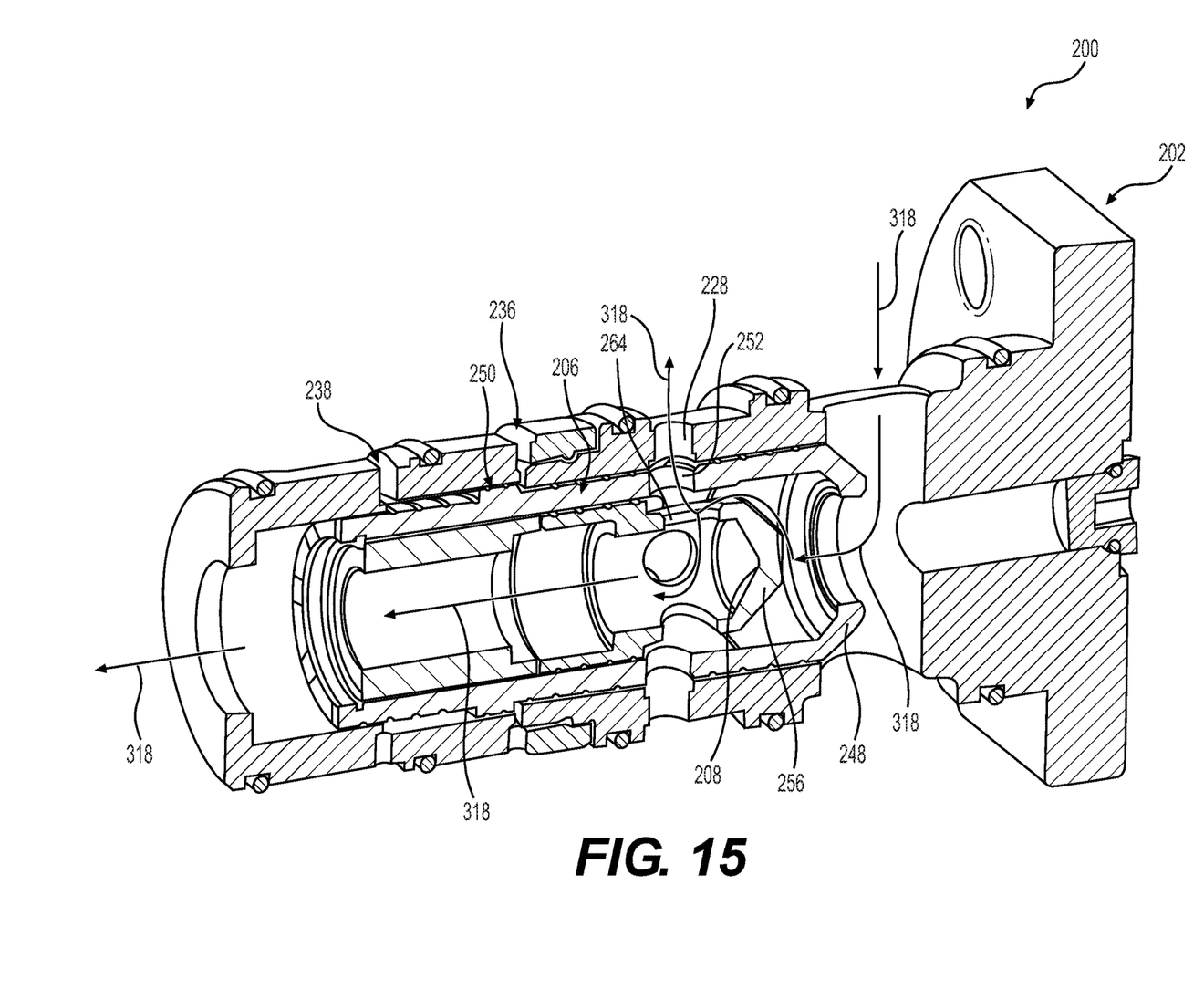
FIG. 15 illustrates the valve assembly of FIG. 14 with the spool shifted to the right due to pilot pressure exerted on the spool, opening the bypass port so that flow through the outlet port is decreased when lubricant runs low.

Over time, the lubricant may start running low in the hammer assembly. In this scenario, a hydraulic signal may be sent through the signal bore 140 (see FIG. 4) to the fourth cross-bore 238 to shift the spool 206 to its rightmost position as seen in FIG. 15. The third cross-bore 236 may act as a vent to facilitate this movement.

In FIG. 15, the second cross-bore 228 of the housing 202 is axially aligned with the first bypass bore 252 of the spool 206, and the first flow bore 264 of the stem 208 since the hydraulic activation ridge 250 is disposed axially proximate to the third cross-bore 236 of the sleeve 204. The stem cone tip 256 is still spaced axially away from the spool cone tip 248 as previously described a moment ago herein.

Consequently, the flow of incoming fluid is split (see arrows 318) between the bypass and the outlet 320, reducing the working of the hammer to reduce the likelihood of wear and/or damage to the hammer mechanism.

Figure 16:
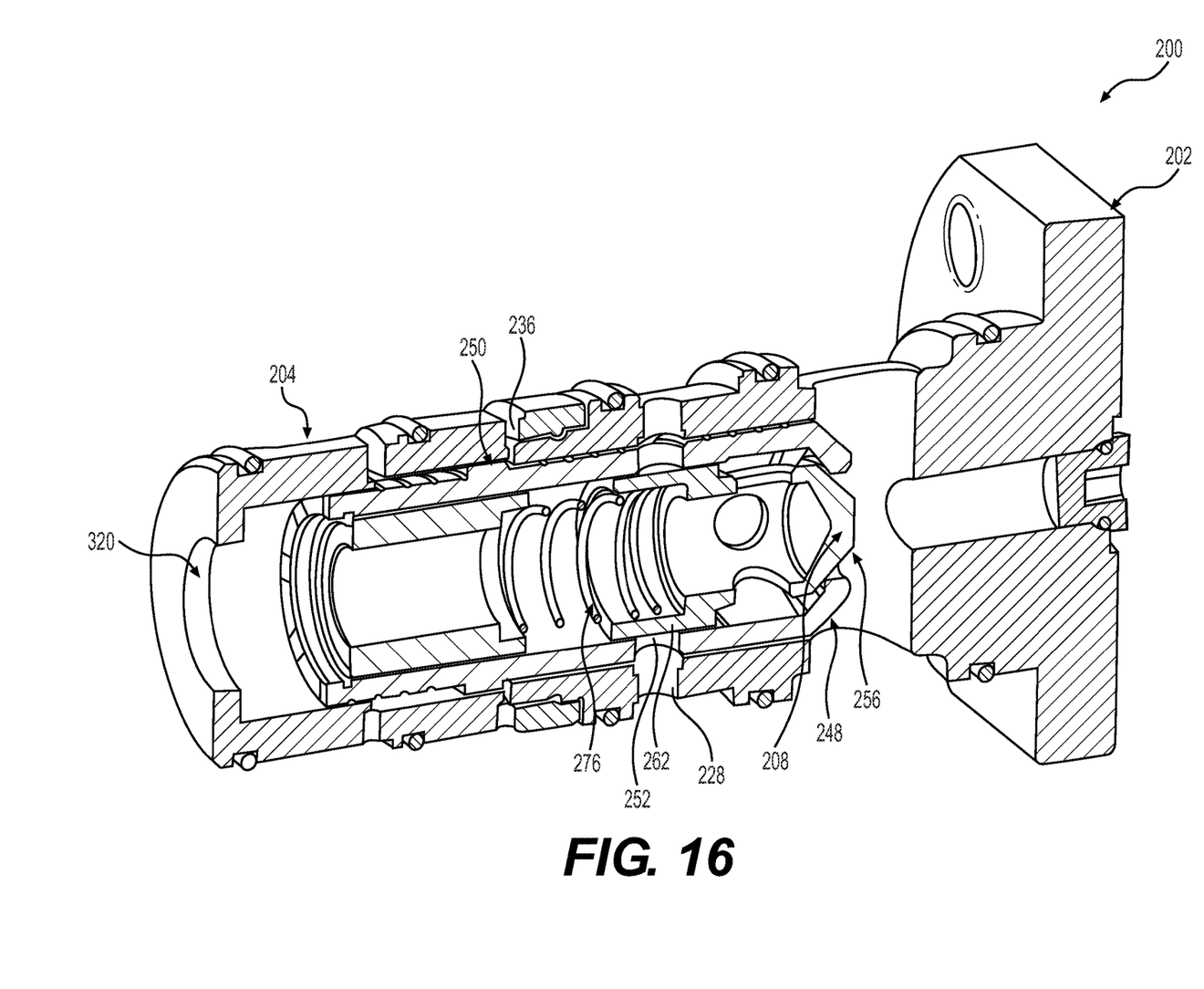
FIG. 16 illustrates the valve assembly of FIG. 14 with the spool shifted to the right and the stem shifted to right when the outlet pressure is higher than the inlet pressure, stopping all fluid from flowing through the valve assembly (this provide the reverse-check function of the valve).

Eventually, the hammer mechanism may cease to function properly, creating a buildup of pressure at the outlet 320. In such a case, the valve assembly 200 may prevent flow back through it since the increased outlet pressure pushes on the back side of the stem 208 or the compression spring 276 overcomes the incoming hydraulic forces until it reaches a rightmost position as shown in FIG. 16.

In this scenario, the stem cone tip 256 contacts the spool cone tip 248, the stem annular wall 262 covers the first bypass bore 252 that is axially aligned with the second cross-bore 228 of the housing 202, and hydraulic activation ridge 250 is disposed axially proximate to the third cross-bore 236 of the sleeve 204.

As can be seen, the valve assembly supplies three different workings states or functions using a concentric design, saving space.

It will be apparent to those skilled in the art that various modifications and variations can be made to the embodiments of the apparatus and methods of assembly as discussed herein without departing from the scope or spirit of the invention(s). Other embodiments of this disclosure will be apparent to those skilled in the art from consideration of the specification and practice of the various embodiments disclosed herein. For example, some of the equipment may be constructed and function differently than what has been described herein and certain steps of any method may be omitted, performed in an order that is different than what has been specifically mentioned or in some cases performed simultaneously or in sub-steps. Furthermore, variations or modifications to certain aspects or features of various embodiments may be made to create further embodiments and features and aspects of various embodiments may be added to or substituted for other features or aspects of other embodiments in order to provide still further embodiments.

Accordingly, it is intended that the specification and examples be considered as exemplary only, with a true scope and spirit of the invention(s) being indicated by the following claims and their equivalents.

What is claimed is:

1. A valve assembly, comprising:
   an outer subassembly, including:
   a housing including an at least partially annular body, and an annular wall, defining a first central bore defining a longitudinal axis, a circumferential direction, a radial direction, and a first longitudinal end disposed along the longitudinal axis, and a second longitudinal end disposed along the longitudinal axis, and further including a flange disposed at the first longitudinal end and the first central bore extends through the second longitudinal end, the annular wall further defining a first cross-bore extending radially through the annular wall to the first central bore proximate to the flange, and a second cross-bore extending radially through the annular wall to the first central bore, the second cross-bore being disposed axially between the second longitudinal end and the first cross-bore; and a sleeve defining a thru-bore, forming a sleeve annular wall, and further defining a proximate end that is configured to mate with the second longitudinal end of the housing, and a distal end, the sleeve annular wall further defining a third-cross bore that extends radially through the sleeve annular wall that is in communication with the thru-bore, and that is disposed adjacent the proximate end, and a fourth cross-bore that extends radially through the sleeve annular wall that is in communication with the thru-bore, and that is disposed axially between the third cross-bore, and the distal end; and an inner subassembly, including:
a spool defining a central bore that extends axially through the spool forming a spool annular wall; and
a stem that is disposed in the central bore, the stem defining a closed axial end including a stem cone tip, an open axial end, and another central bore forming a stem annular wall, and a first flow bore that extends radially through the stem annular wall that is disposed axially between the closed axial end and the open axial end, the stem including a stepped body such that the stem annular wall jogs radially outwardly at a place disposed axially between the first flow bore and the open axial end.

2. The valve assembly of claim 1, wherein the housing further defines a peripheral groove that is in communication with the first cross-bore, the first cross-bore extends radially completely through the housing, and a test bore extends from the first cross-bore through the flange.

3. The valve assembly of claim 1, wherein the proximate end of the sleeve includes a stepped pilot pocket that is in communication with the thru-bore of the sleeve, and the second longitudinal end of the housing includes a stepped pilot ring that fits into the stepped pilot pocket of the sleeve.

4. The valve assembly of claim 3, wherein the thru-bore defines an intermediate diameter portion that extends axially from the stepped pilot pocket toward the distal end, and a reduced diameter portion that extends axially from the intermediate diameter portion toward the distal end, and the third cross-bore and the fourth cross-bore are in fluid communication with the intermediate diameter portion.

5. The valve assembly of claim 1, wherein the housing and the sleeve are separate components, the sleeve further includes a radially inwardly extending rim that partially axially obstructs the thru-bore, and the housing further defines a radially inner circumferentially extending slot that is axially aligned with the second-cross bore, being in fluid communication therewith.

6. An inner subassembly for assembling a valve assembly, the inner subassembly comprising:
a spool defining a central bore that extends axially through the spool forming a spool annular wall, and including a spool cone, and a hydraulic activation ridge extending radially outwardly from the spool annular wall, and further defining a first bypass bore that extends through the spool annular wall to the central bore; and
a stem that is disposed in the central bore, the stem defining a closed axial end including a stem cone tip, an open axial end, and another central bore forming a stem annular wall, and a first flow bore that extends radially through the stem annular wall that is disposed axially between the closed axial end and the open axial end, the stem including a stepped body such that the stem annular wall jogs radially outwardly at a place disposed axially between the first flow bore and the open axial end.

7. The inner subassembly of claim 6, further comprising a snap ring, a guide, and a compression spring, and wherein the spool further defines a snap ring groove that is in communication with the central bore of the spool, the snap ring is disposed in the snap ring groove, the guide abuts the snap ring, and the compression spring contacts the guide and the stem.

8. The inner subassembly of claim 7, wherein the guide defines a distal spring pocket including a distal shoulder surface, and the stem defines a proximate spring pocket disposed at the open axial end, the proximate spring pocket also including a proximate shoulder surface, and the compression spring contacts the distal shoulder surface and the proximate shoulder surface.

9. The inner subassembly of claim 8, wherein the stem cone tip contacts the spool cone tip, and the stem annular wall covers the first bypass bore.

10. The inner subassembly of claim 6, wherein the spool defines a radially outer circumferential surface that defines a plurality of outer circumferentially extending slits, and a radially outer circumferential slot that is axially aligned with the first bypass bore, being in fluid communication therewith, and the stem includes a radially inner circumferential surface that defines a plurality of circumferentially extending grooves at an interface between the spool annular wall and the stem annular wall.

11. A valve assembly comprising:
a housing including an at least partially annular body, and an annular wall, defining a first central bore defining a longitudinal axis, a circumferential direction, a radial direction, and a first longitudinal end disposed along the longitudinal axis, and a second longitudinal end disposed along the longitudinal axis, and further including a flange disposed at the first longitudinal end and the first central bore extends through the second longitudinal end, the annular wall further defining a first cross-bore extending radially through the annular wall to the first central bore proximate to the flange, and a second cross-bore extending radially through the annular wall to the first central bore, the second cross-bore being disposed axially between the second longitudinal end and the first cross-bore;
a sleeve defining a thru-bore, forming a sleeve annular wall, and further defining a proximate end that is configured to mate with the second longitudinal end of the housing, and a distal end that includes a radially inwardly extending rim that partially axially obstructs the thru-bore, the sleeve annular wall further defining a third-cross bore that extends radially through the sleeve annular wall, that is in communication with the thru-bore, and that is disposed adjacent the proximate end, and a fourth cross-bore that extends radially through the sleeve annular wall, that is in communication with the thru-bore, and that is disposed axially between the third cross-bore, and the distal end;
a spool that is disposed in the first central bore and the thru-bore, the spool defining a first axial end, a second axial end, a second central bore that extends axially through the spool forming a spool annular wall, and including a spool cone tip that is disposed at the first axial end, and a hydraulic activation ridge extending radially outwardly from the spool annular wall, and that is disposed axially between the second axial end and the first axial end, and further defining a first bypass bore that extends through the spool annular wall to the second central bore, and that is disposed axially between the first axial end and the hydraulic activation ridge; and a stem that is disposed in the second central bore, the stem defining a closed axial end including a stem cone tip, an open axial end, a third central bore forming a stem annular wall, and a first flow bore that extends radially through the stem annular wall that is disposed axially between the closed axial end and the open axial end, the stem including a stepped body such that the stem annular wall jogs radially outwardly at a place disposed axially between the stem cone tip and the open axial end.

12. The valve assembly of claim 11, further comprising a snap ring, a guide, and a compression spring, and wherein the spool further defines a snap ring groove that is disposed near the second axial end and that is in communication with the second central bore, the snap ring is disposed in the snap ring groove, the guide abuts the snap ring, and the compression spring contacts the guide and the stem.

13. The valve assembly of claim 12, wherein the guide defines a distal spring pocket including a distal shoulder surface, and the stem defines a proximate spring pocket disposed at the open axial end, the proximate spring pocket also including a proximate shoulder surface, and the compression spring contacts the distal shoulder surface and the proximate shoulder surface.

14. The valve assembly of claim 12, wherein the spool contacts the rim of the sleeve, the first bypass bore of the spool, and the first flow bore of the stem are axially aligned with each other, the spool annular wall covers the second cross-bore of the housing, the stem cone tip is spaced axially away from the spool cone tip, forming a flow path between the stem annular wall and the spool annular wall, and the hydraulic activation ridge is disposed axially proximate to the fourth cross-bore of the sleeve.

15. The valve assembly of claim 12, wherein the second cross-bore of the housing is axially aligned with the first bypass bore of the spool, and the first flow bore of the stem, the hydraulic activation ridge is disposed axially proximate to the third cross-bore of the sleeve, and the stem cone tip is spaced axially away from the spool cone tip, forming a flow path between the stem annular wall and the spool annular wall.

16. The valve assembly of claim 12, wherein the stem cone tip contacts the spool cone tip, the stem annular wall covers the first bypass bore that is axially aligned with the second cross-bore of the housing, and hydraulic activation ridge is disposed axially proximate to the third cross-bore of the sleeve.

17. The valve assembly of claim 11, wherein the housing defines a peripheral groove that is in communication with the first cross-bore, and the first cross-bore extends radially completely through the housing.

18. The valve assembly of claim 11, wherein the first central bore includes a large diameter portion that extends through the second longitudinal end, and a small diameter portion that extends through the first longitudinal end, and further comprising a plug that is disposed in the small diameter portion.

19. The valve assembly of claim 11, wherein the proximate end of the sleeve includes a stepped pilot pocket that is in communication with the thru-bore of the sleeve, and the second longitudinal end of the housing includes a stepped pilot ring that fits into the stepped pilot pocket of the sleeve.

20. The valve assembly of claim 19, wherein the thru-bore defines an intermediate diameter portion that extends axially from the stepped pilot pocket toward the distal end, and a reduced diameter portion that extends axially from the intermediate diameter portion toward the rim that is disposed at the distal end, and the hydraulic activation ridge is disposed in the intermediate diameter portion, while the spool annular wall is disposed in the reduced diameter portion of the thru-bore of the sleeve, and the first central bore of the housing, and the third cross-bore and the fourth cross-bore are in fluid communication with the intermediate diameter portion on either axial side of the hydraulic activation ridge.

* * * * *